(12) United States Patent
Rasch

(10) Patent No.: US 9,649,830 B2
(45) Date of Patent: May 16, 2017

(54) BONDED FIBROUS SANITARY TISSUE PRODUCTS AND METHODS FOR MAKING SAME

(75) Inventor: David Mark Rasch, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 821 days.

(21) Appl. No.: 12/624,450

(22) Filed: Nov. 24, 2009

(65) Prior Publication Data

US 2010/0136268 A1 Jun. 3, 2010

Related U.S. Application Data

(60) Provisional application No. 61/119,485, filed on Dec. 3, 2008.

(51) Int. Cl.
*B32B 29/02* (2006.01)
*B32B 29/00* (2006.01)
(Continued)

(52) U.S. Cl.
CPC .............. *B32B 29/007* (2013.01); *B32B 3/08* (2013.01); *B32B 5/022* (2013.01); *B32B 5/024* (2013.01); *B32B 5/026* (2013.01); *B32B 5/26* (2013.01); *B32B 7/12* (2013.01); *B32B 7/14* (2013.01); *B32B 29/005* (2013.01); *B32B 29/02* (2013.01); *B32B 2255/02* (2013.01); *B32B 2255/12* (2013.01); *B32B 2255/26* (2013.01); *B32B 2262/0223* (2013.01); *B32B 2262/0253* (2013.01); *B32B 2262/0261* (2013.01); *B32B 2262/0276* (2013.01); *B32B 2262/06* (2013.01); *B32B 2262/067* (2013.01); *B32B 2262/12* (2013.01); *B32B 2307/54* (2013.01); *B32B 2307/718* (2013.01); *B32B 2307/7163* (2013.01); *B32B 2555/02* (2013.01); *Y10T 428/13* (2015.01); *Y10T 428/1303* (2015.01); *Y10T 428/1362* (2015.01);
(Continued)

(58) Field of Classification Search
CPC .. B65D 83/08; B65D 83/0805; B32B 29/005; B32B 29/02; B32B 29/007; Y10T 428/1362; Y10T 428/1366; Y10T 428/1303
USPC ...... 428/34.2, 36.1; 229/200, 208, 240, 100; 221/33, 56; 206/233, 494
See application file for complete search history.

(56) References Cited

U.S. PATENT DOCUMENTS 3,036,729 A * 5/1962 Asman .......................... 221/48
3,254,793 A * 6/1966 Palmer .......................... 221/63
(Continued)

FOREIGN PATENT DOCUMENTS

EP 0 264 676 A1 4/1988
EP 0 459 110 A2 12/1991
(Continued)

OTHER PUBLICATIONS

U.S. Appl. No. 12/624,452, filed Nov. 24, 2009, John Allen Manifold, et al.
International Search Report Mailed Dec. 3, 2010.

*Primary Examiner* — Walter B Aughenbaugh
(74) *Attorney, Agent, or Firm* — Dara M. Kendall

(57) ABSTRACT

Bonded fibrous articles having one or more bonds that are in contact with a lotion and methods for making such bonded fibrous articles are provided.

6 Claims, 4 Drawing Sheets

(51) Int. Cl.
 B32B 7/14 (2006.01)
 B32B 5/02 (2006.01)
 B32B 5/26 (2006.01)
 B32B 7/12 (2006.01)
 B32B 3/08 (2006.01)

(52) U.S. Cl.
 CPC .. *Y10T 428/1366* (2015.01); *Y10T 428/31504* (2015.04); *Y10T 428/31551* (2015.04); *Y10T 428/31725* (2015.04); *Y10T 428/31786* (2015.04); *Y10T 428/31801* (2015.04); *Y10T 428/31815* (2015.04); *Y10T 428/31935* (2015.04); *Y10T 428/31942* (2015.04); *Y10T 428/31993* (2015.04)

(56) References Cited

U.S. PATENT DOCUMENTS

| | | | |
|---|---|---|---|
| 3,384,224 A * | 5/1968 | Buckholz et al. | 206/233 |
| 3,708,366 A | 1/1973 | Donnelly | |
| 3,899,079 A * | 8/1975 | Seiter | 229/123.2 |
| 4,120,916 A * | 10/1978 | Meyer et al. | 525/240 |
| 4,481,243 A | 11/1984 | Allen | |
| 4,513,051 A | 4/1985 | Lavash | |
| 4,790,436 A * | 12/1988 | Nakamura | 206/449 |
| 4,806,418 A | 2/1989 | Sigl | |
| 4,867,831 A * | 9/1989 | Sigl | 156/283 |
| 4,950,545 A | 8/1990 | Walter et al. | |
| 5,143,776 A * | 9/1992 | Givens | 428/194 |
| 5,227,242 A | 7/1993 | Walter et al. | |
| 5,286,538 A * | 2/1994 | Pearlstein et al. | 428/34.2 |
| 5,409,572 A | 4/1995 | Kershaw et al. | |
| 5,409,747 A * | 4/1995 | Pearlstein et al. | 428/34.2 |
| 5,601,871 A | 2/1997 | Krzysik et al. | |
| 5,614,293 A * | 3/1997 | Krzysik et al. | 428/211.1 |
| 5,650,218 A | 7/1997 | Krzysik et al. | |
| 5,693,406 A | 12/1997 | Wegele et al. | |
| 5,702,571 A | 12/1997 | Kamps et al. | |
| 5,830,487 A | 11/1998 | Klofta et al. | |
| 5,830,558 A | 11/1998 | Barnholtz | |
| 5,858,554 A | 1/1999 | Neal et al. | |
| 5,919,556 A | 7/1999 | Barnholtz | |
| 6,086,715 A | 7/2000 | McNeil | |
| 6,182,418 B1 | 2/2001 | McFarland | |
| 6,217,707 B1 | 4/2001 | Garvey et al. | |
| 6,544,386 B1 | 4/2003 | Krzysik et al. | |
| 6,672,475 B1 * | 1/2004 | Ho et al. | 221/45 |
| 6,924,042 B2 * | 8/2005 | Von Paleske | 428/535 |
| 7,067,585 B2 * | 6/2006 | Wang et al. | 525/191 |
| 7,201,815 B2 * | 4/2007 | Muvundamina | 156/78 |
| 7,262,251 B2 * | 8/2007 | Kanderski et al. | 525/240 |
| 7,377,391 B2 * | 5/2008 | Long et al. | 206/494 |
| 7,717,268 B2 * | 5/2010 | Kleinsmith | 206/494 |
| 7,780,006 B2 * | 8/2010 | Clark et al. | 206/494 |
| 7,926,703 B2 * | 4/2011 | Kleinsmith | 229/162.6 |
| 7,934,597 B2 * | 5/2011 | Zwick et al. | 206/233 |
| 2002/0146561 A1 | 10/2002 | Baumoller et al. | |
| 2003/0119397 A1 * | 6/2003 | Von Paleske | B32B 5/26 442/149 |
| 2003/0205613 A1 * | 11/2003 | Schliebner et al. | 229/118 |
| 2005/0045267 A1 | 3/2005 | Muvundamina | |
| 2005/0230069 A1 | 10/2005 | Hilbig et al. | |
| 2008/0202954 A1 * | 8/2008 | Knobloch et al. | 206/233 |
| 2010/0136294 A1 * | 6/2010 | Manifold et al. | 428/171 |

FOREIGN PATENT DOCUMENTS

| | | |
|---|---|---|
| EP | 1 312 466 A1 | 5/2003 |
| WO | WO 98/29602 A1 | 7/1998 |
| WO | WO 01/10740 A1 | 2/2001 |
| WO | WO 2005/035857 A2 | 4/2005 |
| WO | WO 2005/106119 A1 | 11/2005 |
| WO | WO 2005/113381 A1 | 12/2005 |
| WO | WO 2006/036586 A2 | 4/2006 |
| WO | WO 2006/071147 A1 | 7/2006 |
| WO | WO 2007/031965 A2 | 3/2007 |

* cited by examiner

BONDED FIBROUS SANITARY TISSUE PRODUCTS AND METHODS FOR MAKING SAME

CROSS REFERENCE TO RELATED APPLICATION(S)

This application claims the benefit of U.S. Provisional Application No. 61/119,485, filed Dec. 3, 2008.

FIELD OF THE INVENTION

The present invention relates to bonded fibrous articles, more particularly to bonded fibrous articles comprising one or more bonds that are or over time come in contact with a lotion and methods for making such bonded fibrous articles.

BACKGROUND OF THE INVENTION

It is well known in the art that conventional lotions are not compatible with conventional adhesives; especially conventional adhesives used in plybonding fibrous articles, such as two or more plies of fibrous structure and/or two or more surfaces of cardboard that come together to form at least a portion of a container, carton or box. For example, a conventional lotioned two-ply fibrous structure which comprises one or more bonds comprising an adhesive exhibits a loss of bond strength at the bond when the lotion comes in contact with the adhesive. In another example, a lotion product, such as a lotioned fibrous structure product contained within a container comprising two or more surfaces that are bonded together by an adhesive at one or more bonds, such as a cardboard carton or container, exhibits a decrease in % fiber tear at the bond when the lotion comes in contact with the adhesive.

Lotions are known to migrate throughout and/or about a fibrous article, such as a fibrous structure, a fibrous structure surface and/or from one surface to another, such as in the example of a lotioned fibrous structure contained within a container, such as a cardboard container, wherein lotion migrates from the lotioned fibrous structure to one or more surfaces of the cardboard container. Loss of bond strength and/or reduction of % fiber tear as a result of the negative interaction of the lotion with the adhesive in the scenarios described above will result in the two plies and/or two surfaces becoming more easily separated from one another, especially during use by a consumer.

Accordingly, there exists a need for bonded fibrous articles that have one or more bonds that comprise an adhesive wherein the bond strength and/or % fiber tear of the bond is not significantly reduced when a lotion comes in contact with the adhesive, and a method for making bonded fibrous articles that avoids and/or mitigates the negative interaction of the lotion on the adhesive and thus the bond strength of the bond.

SUMMARY OF THE INVENTION

The present invention fulfills the need described above by providing a bonded fibrous article comprising a bond comprising an adhesive wherein the bond strength and/or % fiber tear of the bonded fibrous article is not significantly reduced when a lotion comes in contact with the adhesive.

In one example of the present invention, a bonded fibrous article comprising a lotion and two or more surfaces bonded together by at least one bond comprising an adhesive, wherein the bonded fibrous article exhibits a bond strength of greater than 3 g/in and/or greater than 5 g/in and/or greater than 7 g/in and/or greater than 10 g/in and/or greater than 12 g/in and/or greater than 15 g/in as determined by the Bond Strength Test Method, is provided.

In another example of the present invention, a bonded fibrous article comprising a lotion and two or more surfaces bonded together by at least one bond comprising an adhesive, wherein the bonded fibrous article exhibits a % fiber tear of at least 20% and/or at least 50% and/or at least 80% and/or at least 90% and/or about 100% as determined by the % Fiber Tear Test Method, is provided.

In even another example of the present invention, a method for making a bonded fibrous article comprising a lotion, the method comprising the step of: bonding a surface of a first ply of fibrous structure comprising a lotion to a surface of a second ply of fibrous structure at least one bond via an adhesive to form a bonded fibrous article wherein the bonded fibrous article exhibits a bond strength of greater than 3 g/in and/or greater than 5 g/in and/or greater than 7 g/in and/or greater than 10 g/in and/or greater than 12 g/in and/or greater than 15 g/in as determined by the Bond Strength Test Method, is provided.

In yet another example of the present invention, a method for making a bonded fibrous article, the method comprising the steps of:
 a. bonding a first surface of a container, such as a cardboard surface, to a second surface of a container, such as a cardboard surface, at least one bond via an adhesive to form a bonded fibrous article; and
 b. subjecting the bond (especially the adhesive) to a lotion, for example by bringing the bond in contact with a lotion which has migrated over time from a lotioned fibrous structure within the container to one or more of the first and second surfaces and ultimately to the adhesive;

wherein the bonded fibrous article exhibits a % fiber tear of at least 20% and/or at least 50% and/or at least 80% and/or at least 90% and/or about 100% as determined by the % Fiber Tear Test Method, is provided.

Accordingly, the present invention provides a bonded fibrous article that comprises at least one bond comprising an adhesive wherein the bond strength and/or % fiber tear of the bonded fibrous article is not significantly reduced when a lotion comes in contact with the adhesive forming the bond within the bonded fibrous article.

DETAILED DESCRIPTION OF THE INVENTION

Definitions

Figure 1:
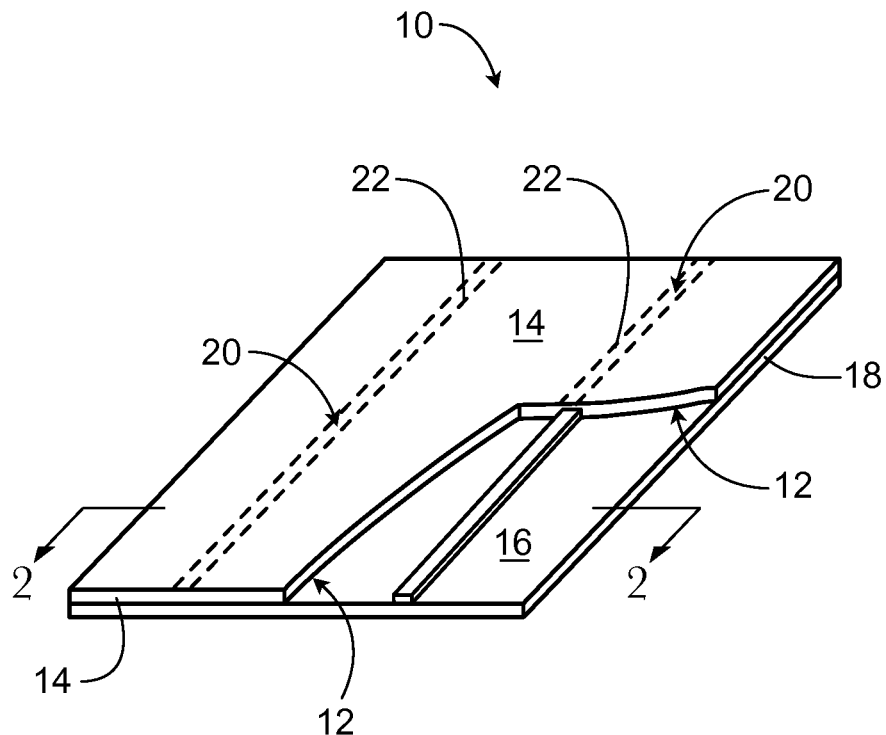
FIG. 1 is a schematic representation of one example of a bonded fibrous article with a cut away portion according to the present invention.

"Bonded Fibrous Article" as used herein means an article comprising two or more fibrous structure surfaces that are associated with one another via a bond comprising an adhesive. For example, a bonded fibrous article of the present invention may be a multi-ply fibrous structure and/or multi-ply sanitary tissue product and/or a cardboard container, carton or box.

"Fibrous structure" as used herein means a structure that comprises one or more filaments and/or fibers. In one example, a fibrous structure according to the present invention means an orderly arrangement of filaments and/or fibers within a structure in order to perform a function. Non-limiting examples of fibrous structures of the present invention include paper, fabrics (including woven, knitted, and non-woven), and absorbent pads (for example for diapers or feminine hygiene products), cardboard, paperboard and mixtures thereof.

Non-limiting examples of processes for making fibrous structures include known wet-laid papermaking processes and air-laid papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous slurry is then used to deposit a plurality of fibers onto a forming wire or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking, and may subsequently be converted into a finished product, e.g. a sanitary tissue product.

The fibrous structure of the present invention may exhibit a basis weight between about 10 g/m² to about 120 g/m² and/or from about 15 g/m² to about 110 g/m² and/or from about 20 g/m² to about 100 g/m² and/or from about 30 to 90 g/m². In addition, the fibrous structure of the present invention may exhibit a basis weight between about 40 g/m² to about 120 g/m² and/or from about 50 g/m² to about 110 g/m² and/or from about 55 g/m² to about 105 g/m² and/or from about 60 to 100 g/m².

The fibrous structure of the present invention may exhibit a total dry tensile strength of greater than about 59 g/cm (150 g/in) and/or from about 78 g/cm (200 g/in) to about 394 g/cm (1000 g/in) and/or from about 98 g/cm (250 g/in) to about 335 g/cm (850 g/in). In addition, the fibrous structure of the present invention may exhibit a total dry tensile strength of greater than about 196 g/cm (500 g/in) and/or from about 196 g/cm (500 g/in) to about 394 g/cm (1000 g/in) and/or from about 216 g/cm (550 g/in) to about 335 g/cm (850 g/in) and/or from about 236 g/cm (600 g/in) to about 315 g/cm (800 g/in). In one example, the fibrous structure exhibits a total dry tensile strength of less than about 394 g/cm (1000 win) and/or less than about 335 g/cm (850 g/in).

In another example, the fibrous structure of the present invention may exhibit a total dry tensile strength of greater than about 196 g/cm (500 g/in) and/or greater than about 236 g/cm (600 g/in) and/or greater than about 276 g/cm (700 g/in) and/or greater than about 315 g/cm (800 g/in) and/or greater than about 354 g/cm (900 g/in) and/or greater than about 394 g/cm (1000 g/in) and/or from about 315 g/cm (800 g/in) to about 1968 g/cm (5000 g/in) and/or from about 354 g/cm (900 g/in) to about 1181 g/cm (3000 g/in) and/or from about 354 g/cm (900 g/in) to about 984 g/cm (2500 g/in) and/or from about 394 g/cm (1000 g/in) to about 787 g/cm (2000 g/in).

The fibrous structure of the present invention may exhibit an initial total wet tensile strength of less than about 78 g/cm (200 g/in) and/or less than about 59 g/cm (150 g/in) and/or less than about 39 g/cm (100 g/in) and/or less than about 29 g/cm (75 g/in).

The fibrous structure of the present invention may exhibit an initial total wet tensile strength of greater than about 118 g/cm (300 g/in) and/or greater than about 157 g/cm (400 g/in) and/or greater than about 196 g/cm (500 g/in) and/or greater than about 236 g/cm (600 g/in) and/or greater than about 276 g/cm (700 g/in) and/or greater than about 315 g/cm (800 g/in) and/or greater than about 354 g/cm (900 g/in) and/or greater than about 394 g/cm (1000 g/in) and/or from about 118 g/cm (300 g/in) to about 1968 g/cm (5000 g/in) and/or from about 157 g/cm (400 g/in) to about 1181 g/cm (3000 g/in) and/or from about 196 g/cm (500 g/in) to about 984 g/cm (2500 g/in) and/or from about 196 g/cm (500 g/in) to about 787 g/cm (2000 g/in) and/or from about 196 g/cm (500 g/in) to about 591 g/cm (1500 g/in).

The fibrous structure of the present invention may exhibit a density (measured at 95 g/in²) of less than about 0.60 g/cm³ and/or less than about 0.30 g/cm³ and/or less than about 0.20 g/cm³ and/or less than about 0.10 g/cm³ and/or less than about 0.07 g/cm³ and/or less than about 0.05 g/cm³ and/or from about 0.01 g/cm³ to about 0.20 g/cm³ and/or from about 0.02 g/cm³ to about 0.10 g/cm³.

The fibrous structure of the present invention may be in the form of fibrous structure rolls. Such fibrous structure rolls may comprise a plurality of connected, but perforated sheets of fibrous structure, that are separably dispensable from adjacent sheets. In one example, one or more ends of the roll of fibrous structure may comprise an adhesive and/or dry strength agent to mitigate the loss of fibers, especially wood pulp fibers from the ends of the roll of fibrous structure.

The fibrous structure of the present invention may comprise a through-air-dried fibrous structure. The fibrous structure may be creped or uncreped. The fibrous structure may be a differential density fibrous structure.

The fibrous structure of the present invention may comprise one or more additives such as softening agents, temporary wet strength agents, permanent wet strength agents, bulk softening agents, lotions, silicones, wetting agents, latexes, especially surface-pattern-applied latexes, dry strength agents such as carboxymethylcellulose and starch, and other types of additives suitable for inclusion in and/or on fibrous structure.

The fibrous structure may comprise a pattern created in converting, such as by embossing and/or created during papermaking, such as by molding into a patterned belt.

"Fiber" and/or "Filament" as used herein means an elongate particulate having an apparent length greatly exceeding its apparent width, i.e. a length to diameter ratio of at least about 10. For purposes of the present invention, a "fiber" is an elongate particulate as described above that exhibits a length of less than 5.08 cm (2 in.) and a "filament" is an elongate particulate as described above that exhibits a length of greater than or equal to 5.08 cm (2 in.).

Fibers are typically considered discontinuous in nature. Non-limiting examples of fibers include wood pulp fibers and synthetic staple fibers such as polyester fibers.

Filaments are typically considered continuous or substantially continuous in nature. Filaments are relatively longer than fibers. Non-limiting examples of filaments include meltblown and/or spunbond filaments. Non-limiting examples of materials that can be spun into filaments include natural polymers, such as starch, starch derivatives, cellulose and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments and polycaprolactone filaments. The filaments may be monocomponent or multicomponent, such as bicomponent filaments.

In one example of the present invention, "fiber" refers to papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. No. 4,300,981 and U.S. Pat. No. 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking.

In addition to the various wood pulp fibers, other cellulosic fibers such as cotton linters, rayon, lyocell and bagasse can be used in this invention. Other sources of cellulose in the form of fibers or capable of being spun into fibers include grasses and grain sources.

"Sanitary tissue product" as used herein means a soft, low density (i.e. <about 0.15 g/cm$^3$) web useful as a wiping implement for post-urinary and post-bowel movement cleaning (toilet tissue), for otorhinolaryngological discharges (facial tissue), and multi-functional absorbent and cleaning uses (absorbent towels). The sanitary tissue product may be convolutedly wound upon itself about a core or without a core to form a sanitary tissue product roll.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Basis Weight" as used herein is the weight per unit area of a sample reported in lbs/3000 ft$^2$ or g/m$^2$.

"Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure can effectively form a multi-ply fibrous structure, for example, by being folded on itself.

"Cardboard" as used herein includes carton board and paper board and any other paper-based materials used to make cartons and/or containers.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Bonded Fibrous Article

The bonded fibrous article according to the present invention comprises two or more surfaces that are bonded together by at least one bond.

Figure 2:
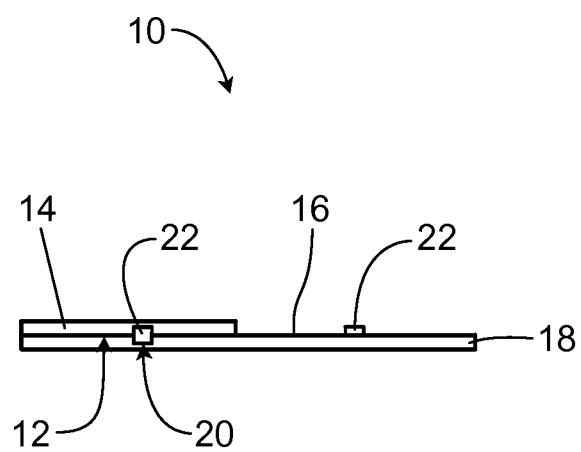
FIG. 2 is a cross-sectional view of FIG. 1 taken along line 2-2.

As shown in FIGS. 1 and 2, in one example, a bonded fibrous article 10, for example a multi-ply fibrous structure, comprises a surface 12 of a first ply of fibrous structure 14 and a surface 16 of a second ply of fibrous structure 18 bonded together by at least one bond 20 comprising an adhesive 22. The bonded fibrous article 10 exhibits a bond strength of greater than 3 g/in as determined by the Bond Strength Test Method. The bonded fibrous article of the present invention may be a sanitary tissue product according to the present invention. The bonded fibrous article of the present invention may comprise two or more fibrous structure plies bonded, for example in a face-to-face relationship, to one another to form a multi-ply fibrous structure, such as a multi-ply sanitary tissue product.

One or more of the plies of the fibrous structures may comprise a lotion. In addition to a lotion, one or more of the plies of the fibrous structures may comprise a surface treating composition and/or skin benefit agent. In one example, the surface treating composition may be position between a surface of a fibrous structure and the lotion, phase registered to one another or not.

In another example, at least one of the plies of the multi-ply fibrous structure of the present invention may comprise substantially machine direction oriented linear channels which may be formed by any suitable process known in the art.

Figure 3:
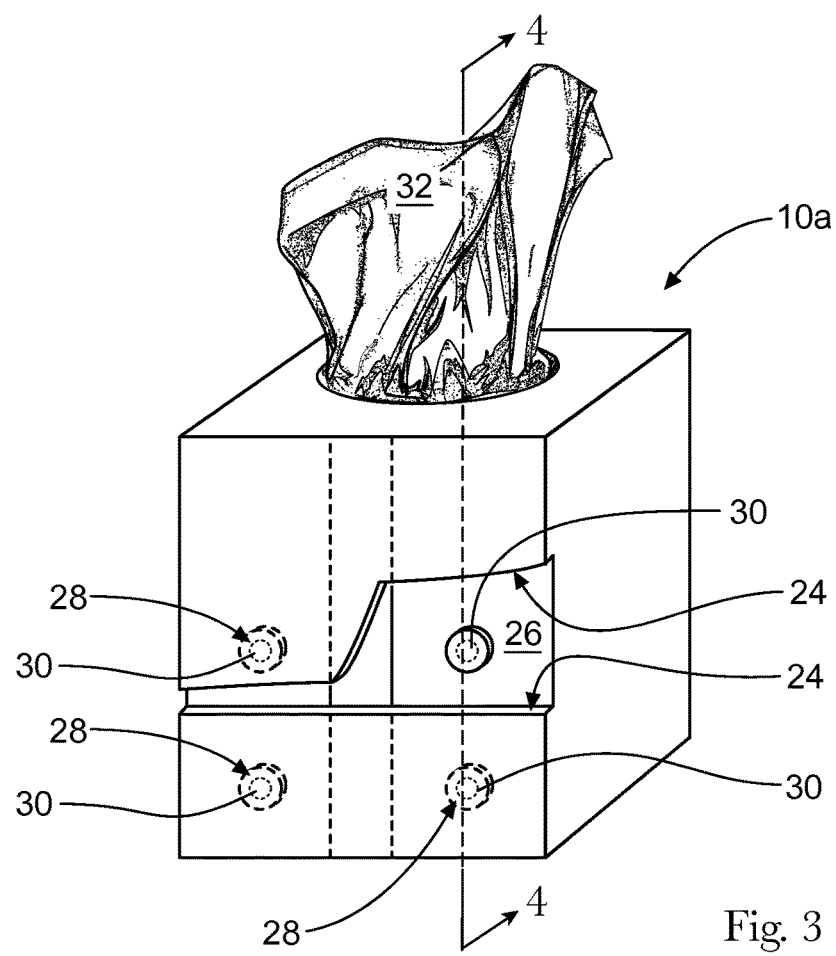
FIG. 3 is a schematic representation of another example of a bonded fibrous article with a cut away portion according to the present invention.
Figure 4:
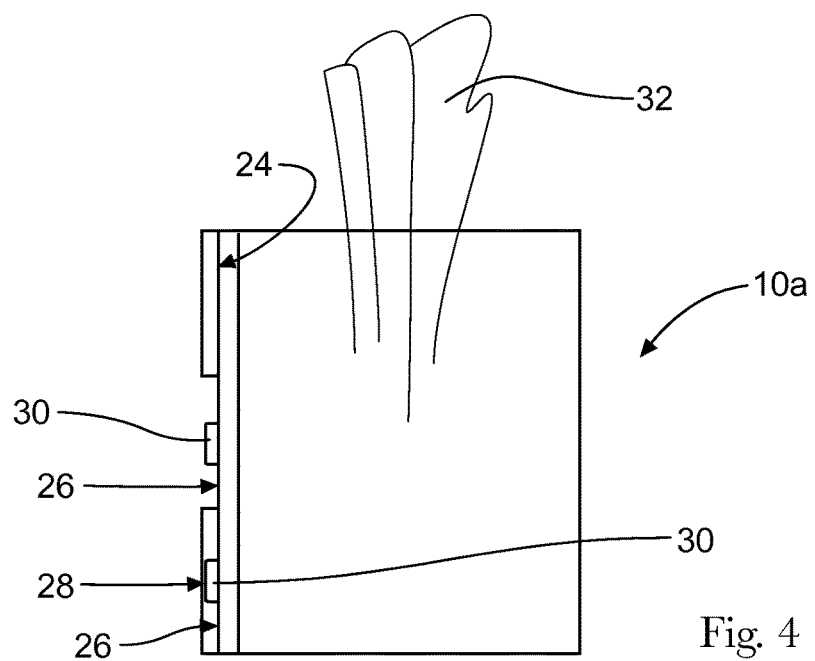
FIG. 4 is a cross-sectional view of FIG. 3 taken along line 4-4.

As shown in FIGS. 3 and 4, in another example, a bonded fibrous article 10a, for example a cardboard container, comprises two or more surfaces, for example a first surface 24 and a second surface 26, bonded together by at least one bond 28 comprising an adhesive 30, wherein the bonded fibrous article 28 exhibits a % fiber tear of at least 20% as determined by the % Fiber Tear Test Method. The bonded fibrous article 10a may be a container, such as a cardboard container, for housing a fibrous structure 32 comprising a lotion. In one example, the bonded fibrous article comprises a container that houses one or more fibrous structures comprising a lotion.

The bonded fibrous article of the present invention may comprise greater than 0.5% and/or at least about 1% and/or at least about 1.5% and/or at least about 2% and/or at least about 5% and/or at least about 10% and/or less than about 50% and/or less than about 30% and/or less than about 20% by weight of the bonded fibrous article of a lotion. In one example, the bonded fibrous article may comprise from greater than 0.5% to less than about 50% and/or from at least about 1% to less than about 30% and/or from at least about 1.5% to less than about 20% by weight of the bonded fibrous article of a lotion.

Methods for Making Bonded Fibrous Articles

Figure 5:
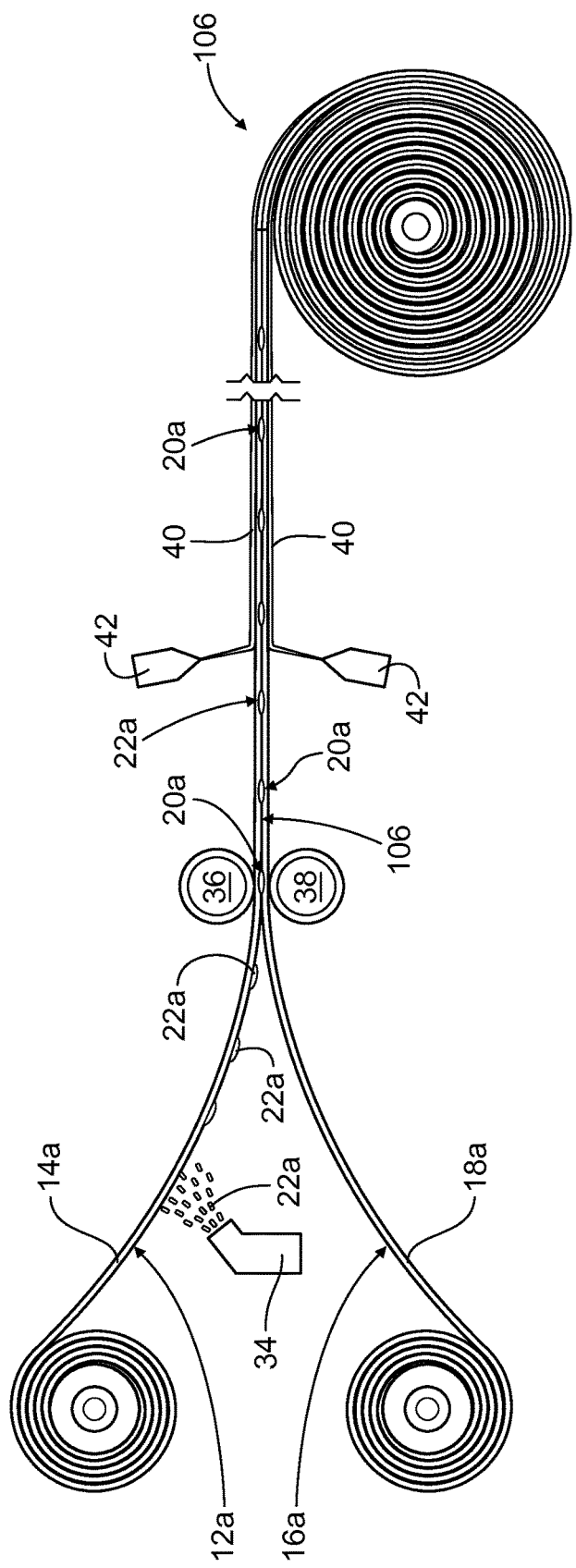
FIG. 5 is a schematic representation of one example of a process for making a bonded fibrous article according to the present invention.

As shown in FIG. 5, a method for making a bonded fibrous article 10b, such as a multi-ply fibrous structure, comprises the step of bonding a surface 12a of a first ply of fibrous structure 14a to a surface 16a of a second ply of fibrous structure 18a at least one bond 20a via an adhesive 22a to form a bonded fibrous article 10b. The step of bonding may comprise applying an adhesive 22a to a surface 12a of a first ply of fibrous structure 14a. In addition, the step of bonding may comprise applying an adhesive 22a to a surface 16a of a second ply of fibrous structure 18a. The adhesive 22a may be applied by any suitable means, such as by extrusion, spraying, dipping, printing and brushing, from an adhesive source 34. In one example, the adhesive 22a is applied in the form of at least one substantially MD oriented stripe, such as down the center of a surface of one of the plies. The bonding step may further comprise associating the adhesive 22a present on surface 12a with the surface 16a to form a bonded fibrous article 10b. In one example, the first and second plies of fibrous structure 14a, 18a are combined together by passing through a nip formed by two rolls 36, 38 such that pressure is applied to the plies 14a, 18a where the adhesive 22a is present resulting in the formation of the bonded fibrous article 10b. In one example, the adhesive, such as HB Fuller's TT5000B adhesive and/or Liquid Polymer Corporation's Liquamelt™ 1100, is applied as a foam using spraying equipment commercially available from Spraying Systems Inc in the form of at least one substantially MD oriented stripe.

Once the bonded fibrous article 10b is formed, the bond 20a, in particular the adhesive 22a, within the bonded fibrous article 10b is exposed to a lotion 40 such as by the lotion 40 migrating from a portion of the bonded fibrous article 10b to the adhesive 22a. The lotion 40 may be applied to one or more of the surfaces of the fibrous structure plies by any suitable means, such as by extrusion, spraying, dipping, printing and brushing, from a lotion source 42 either before application of the adhesive 22a, after application of the adhesive 22a and/or at the same time as application of the adhesive 22a. At some point, based on time, temperature, volume and/or application (wherein the lotion present) the lotion migrates into the bonded fibrous article and comes in contact with the adhesive forming the bond however the bonded fibrous article of the present invention continues to exhibit a bond strength of greater than 3 g/in as determined by the Bond Strength Test Method.

Figure 6:
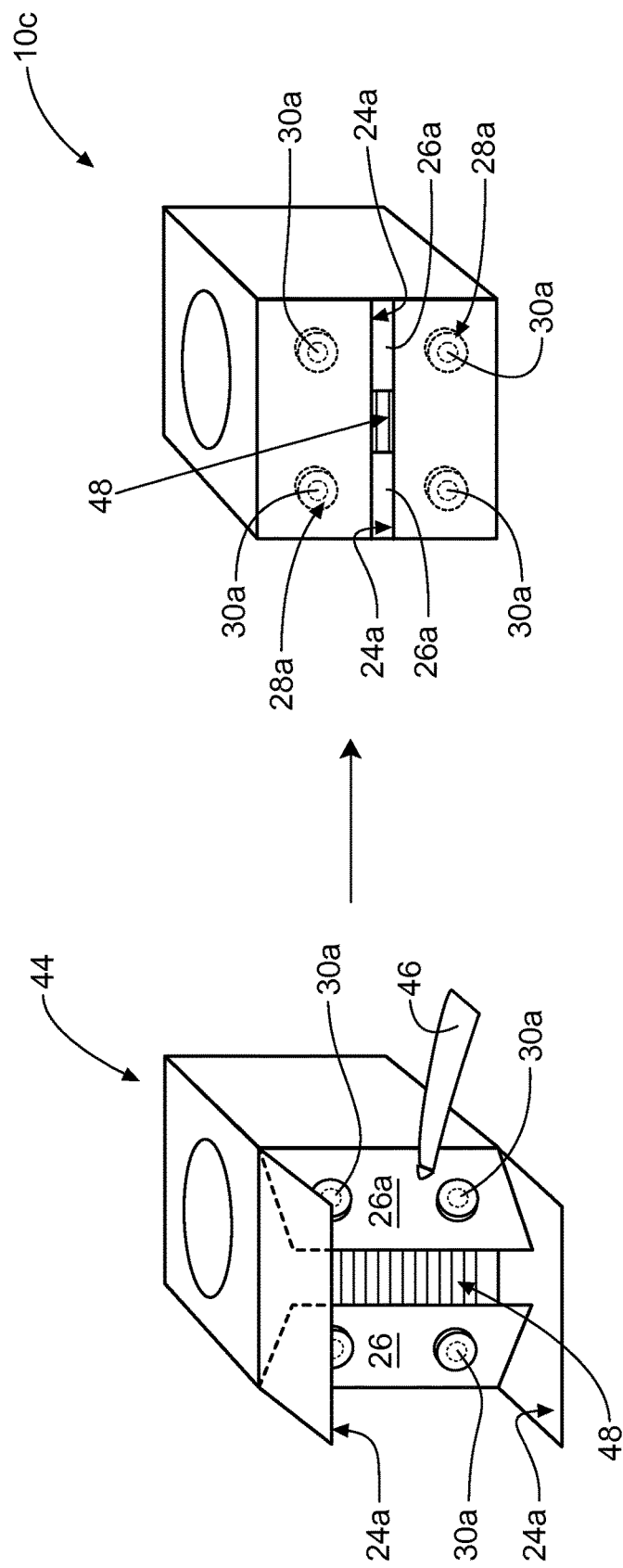
FIG. 6 is a schematic representation of another example of a process for making a bonded fibrous article according to the present invention.

In another example of the present invention, as shown in FIG. 6, a method for making a bonded fibrous article 10c, such as a container or box for example a cardboard container or box for housing a plurality of fibrous structures, comprises the step of bonding a first surface 24a of a container 44 to a second surface 26a of a container 44 at least one bond 28a via an adhesive 30a to form a bonded fibrous article 10c. The step of bonding may comprise applying an adhesive 30a to the second surface 26a of a container 44. In addition, the step of bonding may comprise applying an adhesive 30a to the first surface 24a of a container 44. The adhesive 30a may be applied by any suitable means in the form of a strip, dots, uniform droplets, film for example, such as by extrusion, spraying, dipping, printing and brushing, from an adhesive source 46. The bonding step may further comprise associating the adhesive 30a present on the second surface 26a with the first surface 24a to form a bonded fibrous article 10c. In one example, the first and second surfaces 24a, 26a are combined together by applying pressure to the surfaces when the surfaces are in a face-to-face relationship resulting in the formation of the bonded fibrous article 10c. In one example, the adhesive 30a, such as HB Fuller's TT5000B adhesive and/or Liquid Polymer Corporation's Liquamelt™ 1100, is applied using spraying equipment commercially available from Spraying Systems Inc.

Once the bonded fibrous article 10c is formed, the bond 28a, in particular the adhesive 30a, within the bonded fibrous article 10c is exposed to a lotion, which may migrate from one or more lotion-containing fibrous structures 48 that are housed within the bonded fibrous article 10c to the adhesive 30a. The lotion may be applied to the fibrous structures 48 by any suitable means in the form of a strip, dots, uniform droplets, film for example, for example by extrusion, spraying, dipping, printing and brushing, from a lotion source. At some point, the lotion from the one or more fibrous structures migrates into the bonded article, for example when the fibrous structures are in contact with the container, and comes in contact with the adhesive forming the bond however the bonded fibrous article 10c of the present invention continues to exhibit a % fiber tear of at least 80% as determined by the % Fiber Tear Test Method.

Adhesive

The adhesive of the present invention may be any suitable adhesive that creates a bond between two or more surfaces of a bonded fibrous article of the present invention wherein the bond in contact with a lotion exhibits a bond strength of greater than 3 g/in as determined by the Bond Strength Test Method and/or a % fiber tear of at least 20% as determined by the % Fiber Tear Test Method.

The adhesive may be present in the bonded fibrous article at a level of at least about 0.007% and/or at least about 0.01% by weight and/or less than about 5% by weight and/or from about 0.01% to about 2% by weight and/or from about 0.05% to about 1% and/or from about 0.05% to about 0.4% and/or from about from about 0.05% to about 0.2% by weight. In one example, the adhesive is present in the bonded fibrous article at a level of about 0.1% to about 0.4% by weight.

Non-limiting examples of suitable adhesives includes cold glues, foaming glues and liquid hot melt glues. The glues may be in the form of foamed glues, spray glues and/or liquid glues and mixtures thereof.

The adhesive of the present invention may comprise a water-based adhesive. Non-limiting examples of suitable adhesives are known in the art. For example, a water-based adhesive may comprises an adhesive obtained from polymerizing ethylene and propylene monomeric units.

In one example, the adhesive of the present invention comprises a resin selected from the group consisting of: acrylic, styrene-acrylic, styrene-butadiene, vinyl acetate, polyvinyl alcohol, urethane, chloroprene, phenolic, polyamide, polyether, polyester, polysaccharides (including starch, dextrin, cellulose, gums, or the like), combinations of these, and the like. Particularly useful resin(s) are acrylic, vinyl acetate, polyvinyl alcohol, dextrin, starch, and the like.

Non-limiting examples of foamed glues include foamed glues commercially available from HB Fuller. In one example, the adhesive of the present invention comprises HB Fuller's TT5000B foamed glue. In another example, the adhesive comprises a foamed glue that comprises air cells having an average size in the range of from about 20 to 100 µm.

Non-limiting examples of spray glues include spray glues comprising polyvinyl alcohol.

Non-limiting examples of liquid hot melt glues include liquid hot melt glues commercially available from Liquid Polymer Corporation. In one example, the adhesive of the present invention comprises Liquid Polymer Corporation's Liquamelt™ LM1100 liquid hot melt glue. In another example, the adhesive of the present invention comprises a liquid hot melt glue comprising a polymeric reinforcing phase component and an adsorbent phase component. The polymeric reinforcing phase component may comprise a polymer selected from the group consisting of poly(ethylene-co-vinyl acetate), poly(ethylene-co-vinyl acetate-co-methacrylic acid)terpolymer, poly(ethylene-co-vinyl acetate-co-maleic anhydride)terpolymer and mixtures thereof. The adsorbent phase may comprise a polymer selected from the group consisting of: poly(propylene-co-maleic anhydride).

Other examples of suitable adhesives are commercially available from H.B. Fuller under the trade name WB2746 and/or from Henkel under the trade name 52-6005H.

Lotion

The lotion may comprise oils and/or emollients and/or waxes and/or immobilizing agents. In one example, the lotion comprises from about 10% to about 90% and/or from about 30% to about 90% and/or from about 40% to about 90% and/or from about 40% to about 85% of an oil and/or emollient. In another example, the lotion comprises from about 10% to about 50% and/or from about 15% to about 45% and/or from about 20% to about 40% of an immobilizing agent. In another example, the lotion comprises from about 0% to about 60% and/or from about 5% to about 50% and/or from about 5% to about 40% of petrolatum.

The lotions may be heterogeneous. They may contain solids, gel structures, polymeric material, a multiplicity of phases (such as oily and water phase) and/or emulsified components. It may be difficult to determine precisely the melting temperature of the lotion, i.e. difficult to determine the temperature of transition between the liquid form, the quasi-liquid from, the quasi-solid form and the solid form. The terms melting temperature, melting point, transition point and transition temperature are used interchangeably in this document and have the same meaning.

The lotions may be semi-solid and/or exhibit a high viscosity so they do not substantially flow without activation during the life of the product or gel structures.

The lotions may be shear thinning and/or they may strongly change their viscosity around skin temperature to allow for transfer and easy spreading on a user's skin.

The lotions may be in the form of emulsions and/or dispersions.

In one example of a lotion, the lotion has a water content of less than about 20% and/or less than 10% and/or less than about 5% or less than about 0.5%.

In another example, the lotion may have a solids content of at least about 15% and/or at least about 25% and/or at least about 30% and/or at least about 40% to about 100% and/or to about 95% and/or to about 90% and/or to about 80%.

A non-limiting example of a suitable lotion of the present invention comprises a chemical softening agent, such as an emollient, that softens, soothes, supples, coats, lubricates, or moisturizes the skin. The lotion may sooth, moisturize, and/or lubricate a user's skin.

The lotion may comprise an oil and/or an emollient. Non-limiting examples of suitable oils and/or emollients include polyhydroxy compounds, glycols (such as propylene glycol and/or glycerine), polyglycols (such as triethylene glycol), petrolatum, fatty acids, fatty alcohols, fatty alcohol ethoxylates, fatty alcohol esters and fatty alcohol ethers, fatty acid ethoxylates, fatty acid amides and fatty acid esters, hydrocarbon oils (such as mineral oil), squalane, fluorinated emollients, silicone oil (such as dimethicone) and mixtures thereof.

As used herein, the term "polyhydroxy compounds" is defined as a chemical agent that imparts lubricity or emolliency to tissue paper products and also possesses permanence with regard to maintaining the fidelity of its deposits without substantial migration when exposed to the environmental conditions to which products of this type are ordinarily exposed during their typical life cycle. The lotion of the present invention may contain from about 2.0% to about 30.0% and/or from 5% to about 20.0% and/or from about 8.0% to about 15.0%, of a water soluble polyhydroxy compound, based on the dry fiber weight of the bonded fibrous article.

Examples of water soluble polyhydroxy compounds suitable for use in the present invention include glycerol, polyglycerols having a weight average molecular weight of from about 150 to about 800 and polyoxyethylene and polyoxypropylene having a weight-average molecular weight of from about 200 to about 4000 and/or from about 200 to about 1000 and/or from about 200 to about 600. Mixtures of the above-described polyhydroxy compounds may also be used. For example, mixtures of glycerol and polyglycerols, mixtures of glycerol and polyoxyethylenes, 'mixtures of polyglycerols and polyoxyethylenes, etc. are useful in the present invention. One example of a suitable polyhydroxy compound is polyoxyethylene having a weight average molecular weight of about 200. This material is available commercially from the BASF Corporation of Florham Park, N.J. under the trade names "Pluriol E200" and "Pluracol E200".

Non-limiting examples of emollients useful in the present invention can be petroleum-based, fatty acid ester type, alkyl ethoxylate type, or mixtures of these materials. Suitable petroleum-based emollients include those hydrocarbons, or mixtures of hydrocarbons, having chain lengths of from 16 to 32 carbon atoms. Petroleum based hydrocarbons having these chain lengths include petrolatum (also known as "mineral wax," "petroleum jelly" and "mineral jelly"). Petrolatum usually refers to more viscous mixtures of hydrocarbons having from 16 to 32 carbon atoms. A suitable Petrolatum is available from Witco, Corp., Greenwich, Conn. as White Protopet® 1 S.

Suitable fatty acid ester emollients include those derived from long chain $C_{12}$-$C_{28}$ fatty acids, such as $C_{16}$-$C_{22}$ saturated fatty acids, and short chain $C_1$-$C_8$ monohydric alcohols, such as $C_1$-$C_3$ monohydric alcohols. Non-limiting examples of suitable fatty acid ester emollients include methyl palmitate, methyl stearate, isopropyl laurate, isopropyl myristate, isopropyl palmitate, and ethylhexyl palmitate. Suitable fatty acid ester emollients can also be derived from esters of longer chain fatty alcohols ($C_{12}$-$C_{28}$, such as $C_{12}$-$C_{16}$) and shorter chain fatty acids e.g., lactic acid, such as lauryl lactate and cetyl lactate.

Suitable fatty acid ester type emollients include those derived from $C_{12}$-$C_{18}$ fatty acids, such as $C_{16}$-$C_{22}$ saturated fatty acids, and short chain ($C_1$-$C_8$ and/or $C_1$-$C_3$) monohydric alcohols. Representative examples of such esters include methyl palmitate, methyl stearate, isopropyl laurate, isopropyl myristate, isopropyl palmitate, and ethylhexyl palmitate. Suitable fatty acid ester emollients can also be derived from esters of longer chain fatty alcohols ($C_{12}$-$C_{28}$ and/or $C_{12}$-$C_{16}$) and shorter chain fatty acids e.g., lactic acid, such as lauryl lactate and cetyl lactate.

Suitable alkyl ethoxylate type emollients include $C_{12}$-$C_{18}$ fatty alcohol ethoxylates having an average of from 3 to 30 oxyethylene units, such as from about 4 to about 23. Non-limiting examples of such alkyl ethoxylates include laureth-3 (a lauryl ethoxylate having an average of 3 oxyethylene units), laureth-23 (a lauryl ethoxylate having an average of 23 oxyethylene units), ceteth-10 (acetyl ethoxylate having an average of 10 oxyethylene units), steareth-2 (a stearyl ethoxylate having an average of 2 oxyethylene units) and steareth-10 (a stearyl ethoxylate having an average of 10 oxyethylene units). These alkyl ethoxylate emollients are typically used in combination with the petroleum-based emollients, such as petrolatum, at a weight ratio of alkyl ethoxylate emollient to petroleum-based emollient of from about 1:1 to about 1:3 and/or from about 1:1.5 to about 1:2.5.

The lotions of the present invention may include an "immobilizing agent", so-called because they are believed to act to prevent migration of the emollient so that it can remain primarily on the surface of the fibrous structure to which it is applied so that it may deliver maximum softening benefit as well as be available for transferability to the user's skin. Suitable immobilizing agents for the present invention can comprise polyhydroxy fatty acid esters, polyhydroxy fatty acid amides, and mixtures thereof. To be useful as immobilizing agents, the polyhydroxy moiety of the ester or amide should have at least two free hydroxy groups. It is believed that these free hydroxy groups are the ones that co-crosslink through hydrogen bonds with the cellulosic fibers of the tissue paper web to which the lotion is applied and homo-crosslink, also through hydrogen bonds, the hydroxy groups of the ester or amide, thus entrapping and immobilizing the other components in the lotion matrix. Non-limiting examples of suitable esters and amides will have three or more free hydroxy groups on the polyhydroxy moiety and are typically nonionic in character. Because of the skin sensitivity of those using paper products to which the lotion is applied, these esters and amides should also be relatively mild and non-irritating to the skin.

Suitable polyhydroxy fatty acid esters for use in the present invention will have the formula:

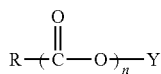

wherein R is a $C_5$-$C_{31}$ hydrocarbyl group, such as a straight chain $C_7$-$C_{19}$ alkyl or alkenyl and/or a straight chain $C_9$-$C_{17}$ alkyl or alkenyl and/or a straight chain $C_{11}$-$C_{17}$ alkyl or alkenyl, or mixture thereof; Y is a polyhydroxyhydrocarbyl moiety having a hydrocarbyl chain with at least 2 free hydroxyls directly connected to the chain; and n is at least 1. Suitable Y groups can be derived from polyols such as glycerol, pentaerythritol; sugars such as raffinose, maltodextrose, galactose, sucrose, glucose, xylose, fructose, maltose, lactose, mannose and erythrose; sugar alcohols such as erythritol, xylitol, malitol, mannitol and sorbitol; and anhydrides of sugar alcohols such as sorbitan.

One class of suitable polyhydroxy fatty acid esters for use in the present invention comprises certain sorbitan esters, such as sorbitan esters of $C_{16}$-$C_{22}$ saturated fatty acids.

Immobilizing agents include agents that are may prevent migration of the emollient into the fibrous structure such that the emollient remain primarily on the surface of the fibrous structure and/or sanitary tissue product and/or on the surface treating composition on a surface of the fibrous structure and/or sanitary tissue product and facilitate transfer of the lotion to a user's skin. Immobilizing agents may function as viscosity increasing agents and/or gelling agents.

Non-limiting examples of suitable immobilizing agents include waxes (such as ceresin wax, ozokerite, microcrystalline wax, petroleum waxes, fisher tropsh waxes, silicone waxes, paraffin waxes), fatty alcohols (such as cetyl, cetaryl, cetearyl and/or stearyl alcohol), fatty acids and their salts (such as metal salts of stearic acid), mono and polyhydroxy fatty acid esters, mono and polyhydroxy fatty acid amides, silica and silica derivatives, gelling agents, thickeners and mixtures thereof.

In one example, the lotion comprises at least one immobilizing agent and at least one emollient.

The lotion may be a transferable lotion. A transferable lotion comprises at least one component that is capable of being transferred to an opposing surface such as a user's skin upon use. In one example, at least 0.1% of the transferable lotion present on the user contacting surface transfers to the user's skin during use.

Surface Treating Composition

A surface treating composition, for purposes of the present invention, is a composition that improves the tactile sensation of a surface, such as a surface of a fibrous structure perceived by a user whom holds a fibrous structure and/or sanitary tissue product comprising the fibrous structure and rubs it across the user's skin. Such tactile perceivable softness can be characterized by, but is not limited to, friction, flexibility, and smoothness, as well as subjective descriptors, such as a feeling like lubricious, velvet, silk or flannel.

The surface treating composition may or may not be transferable. Typically, it is substantially non-transferable.

The surface treating composition may increase or decrease the surface friction of the surface of the fibrous structure, especially the user contacting surface of the fibrous structure. Typically, the surface treating composition will reduce the surface friction of the surface of the fibrous structure compared to a surface of the fibrous structure without such surface treating composition.

The surface treating composition may have a wettability tension less than or equal to the surface tension of a lotion applied to a surface of a fibrous structure treated with the surface treating composition so as to minimize the spreading of the lotion that comes into contact with the surface treating composition and/or to reduce and/or inhibit migration of the lotion into the fibrous structure.

The surface treating composition comprises a surface treating agent. The surface treating composition during application to the fibrous structure may comprise at least about 0.1% and/or at least 0.5% and/or at least about 1% and/or at least about 3% and/or at least about 5% to about 90% and/or to about 80% and/or to about 70% and/or to about 50% and/or to about 40% by weight of the surface treating agent. In one example, the surface treating composition comprises from about 5% to about 40% by weight of the surface treating agent.

A bonded fibrous structure, such as a fibrous structure and/or sanitary tissue product comprising a fibrous structure according to the present invention may comprise at least about 0.01% and/or at least about 0.05% and/or at least about 0.1% of total basis weight of the surface treating agent. In one example, the fibrous structure and/or sanitary tissue product may comprise from about 0.01% to about 20% and/or from about 0.05% to about 15% and/or from about 0.1% to about 10% and/or from about 0.01% to about 5% and/or from about 0.1% to about 2% of total basis weight of the surface treating composition.

Non-limiting examples of suitable surface treating agents can be selected from the group consisting of: polymers such as polyethylene and derivatives thereof, hydrocarbons, waxes, oils, silicones, polysiloxanes, organosilicones (oil compatible), quaternary ammonium compounds, fluorocarbons, substituted $C_{10}$-$C_{22}$ alkanes, substituted $C_{10}$-$C_{22}$ alkenes, in particular derivatives of fatty alcohols and fatty acids (such as fatty acid amides, fatty acid condensates and fatty alcohol condensates), polyols, derivatives of polyols (such as esters and ethers), sugar derivatives (such as ethers and esters), polyglycols (such as polyethyleneglycol) and mixtures thereof.

In one example, the surface treating composition of the present invention is a microemulsion and/or a macroemulsion of a surface treating agent (for example an aminofunctional polydimethylsiloxane, specifically an aminoethylaminopropyl polydimethylsiloxane) in water. In such an example, the concentration of the surface treating agent within the surface treating composition may be from about 3% to about 60% and/or from about 4% to about 50% and/or from about 5% to about 40%. A non-limiting example of such microemulsions are commercially available from Wacker Chemie (MR1003, MR103, MR102). A non-limiting example of such a macroemulsion is commercially available from General Electric Silicones (CM849).

Non-limiting examples of suitable waxes may be selected from the group consisting of: paraffin, polyethylene waxes, beeswax and mixtures thereof.

Non-limiting examples of suitable oils may be selected from the group consisting of: mineral oil, silicone oil, silicone gels, petrolatum and mixtures thereof.

Non-limiting examples of suitable silicones may be selected from the group consisting of: polydimethylsiloxanes, aminosilicones, cationic silicones, quaternary silicones, silicone betaines and mixtures thereof.

Non-limiting examples of quaternary ammonium compounds suitable for use in the present invention include the well-known dialkyldimethylammonium salts such as ditallowedimethylammonium chloride, ditallowedimethylammonium methylsulfate, di(hydrogenated tallow)dimethylammonium chloride. In one example, the surface treating composition comprises di(hydrogenated tallow)dimethylammonium chloride, commercially available from Witco Chemical Company Inc. of Dublin, Ohio as Varisoft 137®.

Non-limiting examples of ester-functional quaternary ammonium compounds having the structures named above and suitable for use in the present invention include the well-known diester dialkyl dimethyl ammonium salts such as diester ditallow dimethyl ammonium chloride, monoester ditallow dimethyl ammonium chloride, diester ditallow dimethyl ammonium methyl sulfate, diester di(hydrogenated) tallow dimethyl ammonium methyl sulfate, diester di(hydrogenated)tallow dimethyl ammonium chloride, and mixtures thereof. In one example, the surface treating composition comprises diester ditallow dimethyl ammonium chloride and/or diester di(hydrogenated)tallow dimethyl ammonium chloride, both commercially available from Witco Chemical Company Inc. of Dublin, Ohio under the tradename "ADOGEN SDMC".

The surface treating composition may comprise additional ingredients such as a vehicle as described herein below which may not be present on the fibrous structure and/or sanitary tissue product comprising such fibrous structure. In one example, the surface treating composition may comprise a surface treating agent and a vehicle such as water to facilitate the application of the surface treating agent onto the surface of the fibrous structure.

Skin Benefit Agent

One or more skin benefit agents may be included in the lotion of the present invention. If a skin benefit agent is included in the lotion, it may be present in the lotion at a level of from about 0.5% to about 80% and/or 0.5% to about 70% and/or from about 5% to about 60% by weight of the lotion.

Non-limiting examples of skin benefit agents include zinc oxide, vitamins, such as Vitamin B3 and/or Vitamin E, sucrose esters of fatty acids, such as Sefose 1618S (commercially available from Procter & Gamble Chemicals), antiviral agents, anti-inflammatory compounds, lipid, inorganic anions, inorganic cations, protease inhibitors, sequestration agents, chamomile extracts, aloe vera, *calendula officinalis*, alpha bisalbolol, Vitamin E acetate and mixtures thereof.

Non-limiting examples of suitable skin benefit agents include fats, fatty acids, fatty acid esters, fatty alcohols, triglycerides, phospholipids, mineral oils, essential oils, natural oils, sterols, sterol esters, emollients, waxes, humectants and combinations thereof.

In one example, the skin benefit agent may be any substance that has a higher affinity for oil over water and/or provides a skin health benefit by directly interacting with the skin. Suitable examples of such benefits include, but are not limited to, enhancing skin barrier function, enhancing moisturization and nourishing the skin.

The skin benefit agent may be alone, included in a lotion and/or included in a surface treating composition. A commercially available lotion comprising a skin benefit agent is Vaseline® Intensive Care Lotion (Chesebrough-Pond's, Inc.).

Other Ingredients

Other optional ingredients that may be included in the lotion include vehicles, perfumes, especially long lasting and/or enduring perfumes, antibacterial actives, antiviral actives, disinfectants, pharmaceutical actives, film formers, deodorants, opacifiers, astringents, solvents, cooling sensate agents, such as camphor, thymol and menthol, warming sensate agents, such as polyhydric alcohols (propylene glycol, butylene glycol, hexylene glycol, polyethylene glycol), vanilla alcohol n-butylether, vanillyl alcohol n-propylether, vanillyl alcohol isopropylether, vanillyl alcohol isobutylether, vanillyl alcohol n-aminoether, vanillyl alcohol isoamylether, vanillyl alcohol n-hexylether, vanillyl alcohol methylether, vanillyl alcohol ethylether, gingerol, shogaol, paradol, zingerone, capsaicin, dihydrocapsaicin, nordihydrocapsaicin, homocapsaicin, homodihydrocapsaicin, ethanol, isopropyl alcohol, iso-amylalcohol, benzyl alcohol, glycerine.

Vehicle

As used herein a "vehicle" is a material that can be used to dilute and/or emulsify agents forming the surface treating composition and/or lotion to form a dispersion/emulsion. A vehicle may be present in the surface treating composition and/or lotion, especially during application of the surface treating composition and/or to the fibrous structure. A vehicle may dissolve a component (true solution or micellar solution) or a component may be dispersed throughout the vehicle (dispersion or emulsion). The vehicle of a suspension or emulsion is typically the continuous phase thereof. That is, other components of the dispersion or emulsion are dispersed on a molecular level or as discrete particles throughout the vehicle.

Suitable materials for use as the vehicle of the present invention include hydroxyl functional liquids, including but not limited to water. In one example, the lotion comprises less than about 20% and/or less than about 10% and/or less than about 5% and/or less than about 0.5% w/w of a vehicle, such as water. In one example, the surface treating composition comprises greater than about 50% and/or greater than about 70% and/or greater than about 85% and/or greater than about 95% and/or greater than about 98% w/w of a vehicle, such as water.

Process Aids

Process aids may also be used in the lotions of the present invention. Non-limiting examples of suitable process aids include brighteners, such as TINOPAL CBS-X®, obtainable from CIBA-GEIGY of Greensboro, N.C.

Non-Limiting Examples of Lotions

Example 1 of a Lotion

| | |
|---|---|
| Stearyl Alcohol | 40% w/w |
| Petrolatum | 30% w/w |
| Mineral Oil | 30% w/w |

Example 2 of a Lotion

| | |
|---|---|
| Mineral Oil | 55% w/w |
| Paraffin | 12% w/w |
| Cetaryl Alcohol | 21% w/w |
| Steareth-2 | 11% w/w |
| Skin Benefit Agent | 1% w/w |

Example 3 of a Lotion

| | |
|---|---|
| Mineral Oil | 55.4% w/w |
| Cetearyl Alcohol | 20.75% w/w |
| Paraffin Wax | 11.86% w/w |
| Steareth-2 | 10.77% w/w |
| Skin Benefit Agents | 1.22% w/w |

Non-Limiting Example of a Bonded Fibrous Article

The following Example illustrates a non-limiting example for a preparation of a bonded fibrous article, in this case a bonded, multi-ply sanitary tissue product comprising a fibrous structure according to the present invention, on a pilot-scale Fourdrinier fibrous structure making machine.

An aqueous slurry of Eucalyptus (Aracruz Brazilian bleached hardwood kraft pulp) pulp fibers is prepared at about 3% fiber by weight using a conventional repulper. This slurry is passed through a stock pipe toward a multi-layered, three-chambered headbox of a Fourdrinier wet laid paper-making machine.

Separately, an aqueous slurry of Eucalyptus fibers is prepared at about 3% by weight using a conventional re-pulper. This slurry is passed through a stock pipe toward the multi-layered, three-chambered headbox of a Fourdrinier wet laid papermaking machine.

Finally, an aqueous slurry of NSK (Northern Softwood Kraft) fibers of about 3% by weight is made up using a conventional re-pulper. This NSK slurry is passed through a refiner and is refined to a Canadian Standard Freeness (CSF) of about 500. The refined NSK is then directed through a stock pipe toward the multi-layered, three-chambered headbox of a Fourdrinier wet laid papermaking machine.

The NSK and eucalyptus fiber slurries are diluted with white water at the inlet of their respective fan pumps to consistencies of about 0.15% based on the total weight of the respective slurries. The three slurries are spread over the width of the Fourdrinier, but maintained as separate streams in the multi-chambered headbox until they are deposited onto a forming wire on the Fourdrinier.

The fibrous structure making machine has a layered headbox having a top chamber, a center chamber, and a bottom chamber. The eucalyptus fiber slurry is pumped through the top headbox chamber, the eucalyptus fiber slurry is pumped through the bottom headbox chamber (i.e. the chamber feeding directly onto the forming wire) and, finally, the NSK fiber slurry is pumped through the center headbox chamber and delivered in superposed relation onto the Fourdrinier wire to form thereon a three-layer embryonic web, of which about 33% of the top side is made up of the eucalyptus blended fibers, about 33% is made of the eucalyptus fibers on the bottom side and about 33% is made up of the NSK fibers in the center. Dewatering occurs through the Fourdrinier wire and is assisted by a deflector and vacuum boxes. The Fourdrinier wire is of an Asten Johnson 866A. The speed of the Fourdrinier wire is about 2650 feet (807.7 m) per minute (fpm).

The embryonic wet web is transferred from the Fourdrinier wire, at a fiber consistency of about 15% at the point of transfer, to a patterned drying fabric. The speed of the patterned drying fabric is the same as the speed of the Fourdrinier wire. The drying fabric is designed to yield a large pillow patterns surrounded by a continuous network of high density (knuckle) areas. This drying fabric is formed by casting an impervious resin surface onto a fiber mesh supporting fabric. The supporting fabric is a 98×62 filament, dual layer mesh. The thickness of the resin cast is about 10 mils above the supporting fabric.

Further de-watering is accomplished by vacuum assisted drainage until the web has a fiber consistency of about 20% to 30%.

While remaining in contact with the patterned drying fabric, the web is pre-dried by air blow-through pre-dryers to a fiber consistency of about 65% by weight.

After the pre-dryers, the semi-dry web is transferred to the Yankee dryer and adhered to the surface of the Yankee dryer with a sprayed creping adhesive. The creping adhesive is an aqueous dispersion with the actives consisting of about 22% polyvinyl alcohol, about 11% CREPETROL A3025, and about 67% CREPETROL R6390. CREPETROL A3025 and CREPETROL R6390 are commercially available from Hercules Incorporated of Wilmington, Del. The creping adhesive is delivered to the Yankee surface at a rate of about 0.15% adhesive solids based on the dry weight of the web. The fiber consistency is increased to about 97% before the web is dry-creped from the Yankee with a doctor blade.

The doctor blade has a bevel angle of about 25 degrees and is positioned with respect to the Yankee dryer to provide an impact angle of about 81 degrees. The Yankee dryer is operated at a temperature of about 332° F. (166.6° C.) and a speed of about 2650 fpm (807.7 m/min). The fibrous structure is wound in a roll using a surface driven reel drum having a surface speed of about 2255 fpm (687.3 m/min). The fibrous structure may be subsequently converted into a two-ply sanitary tissue product.

Two parent rolls of the fibrous structure are loaded on the unwind stand of a combiner to combine plies into two-plies. The combiner is run at 1900 feet per minute (579.1 m/min.). The glue header applies ply-bond glue coverage at 1 nozzle per roll position. The ply-bond glue (HB Fuller's TT5000B) is applied to the non-consumer side of the fibrous structure at a rate of about 4.5 mg/meter at each roll position. The combined two-ply fibrous structure then passes over a set of extrusion headers at a speed of 1900 feet per minute (579.1 m/min.) where a surface treating composition, in this case silicone, is applied on the both consumer-sides of the combined fibrous structure at a total add-on level of 5100 ppm (parts per million). The combined, two-ply fibrous structure then passes over a second set of extrusion headers at a speed of 1900 feet per minute (579.1 m/min.) where lotion is applied to both consumer-sides of the fibrous structure at a total add-on level of about 3.0 lbs per 3000 ft$^2$ ream. The combined, two-ply fibrous structure with lotion is then wound into a parent roll at the rewind at a speed of 1900 feet per minute (579.1 m/min.).

The combined, two-ply parent roll with lotion is loaded onto the unwind stand of the converting line. The combined, two-ply fibrous structure with lotion is passed through a perforation station where it is perforated and rewound into logs of desired finished product roll length and sheet length at a speed of 1479 feet per minute (450.8 m/min.).

The logs are transferred to a log saw where they are cut into finished product rolls of the desired consumer width. The resulting multi-ply sanitary tissue paper product is very soft, flexible and absorbent.

Test Methods

Unless otherwise indicated, all tests described herein including those described under the Definitions section and the following test methods are conducted on samples that have been conditioned first in a conditioned room at a temperature of 120° F.±4° F. (about 49° C.±2.2° C.) and a relative humidity of 60%±10% for 4 weeks and then the samples, test equipment and test surfaces, if any, are conditioned in a conditioned room at a temperature of 73° F.±4° F. (about 23° C.±2.2° C.) and a relative humidity of 50%±10% for 24 hours prior to the test. Further, all tests are conducted in the second conditioned room.

Bond Strength Test Method

The bond strength (dry bond strength for purposes of the present invention) of a bonded fibrous article comprising a lotion is measured using a tensile tester. Strips of 7.62 cm wide by 10.52 cm long are cut in the cross machine direction from four samples of a bonded fibrous article. Each of the strips of bonded fibrous article comprises at least one bond comprising an adhesive and a lotion in contact with the adhesive. If the bonded fibrous article is a multi-ply fibrous structure in roll form, cut the samples from greater than 100 cm from the ends of the roll. The plies or bonded surfaces of each sample strip are initially separated from one another about 5 cm along either of the 7.62 cm wide edges, so that each ply or bonded surface is available independent of the other and each ply or bonded surface has a gauge length of 5.08 cm. Each ply or bonded surface of a strip is placed in a jaw (grip) of a tensile tester. A suitable tensile tester is an EJA Vantage tensile tester available from Thwing-Albert Instrument Company, West Berlin, N.J. The sample strip needs to be centered in the grips and straight. The crosshead separation speed is set at 20 inches per minute, the test distance is set at 6.5 inches, the load cell is 5000 g and the load divider is set at 3. Activate the tensile tester. When the test is complete, record the load mean value in g/in. Remove the sample strip from the grips and discard. Check the load cell for a zero reading. Repeat the process for each sample strip. Four samples are tested in tension. The four bond strength numbers are then averaged to give an average bond strength value in g/in units. The bond strength value reported and used within the present invention is the average bond strength value in g/in units.

Care must be taken that the portion of the sample yet to be separated by the tensile machine does not contact the lower jaw or the lower crosshead of the tensile machine. If such contact occurs, it will register on the load cell and give a reading which is erroneously high. Similarly, care must be taken that the portion of the sample yet to be separated does not contact the portion of the sample having the plies already separated by the tensile tester. If such contact occurs, it will falsely increase the apparent ply bond strength. If either of the aforementioned contacts occurs, the data point is to be discarded and a new sample tested.

Do not use bonded fibrous article samples that contain obvious defects, such as wrinkles, creases, tears, holes, etc.

% Fiber Tear Test Method

The % fiber tear test is conducted with a bonded fibrous article that contains an adhesive that is in contact with a lotion. For example, a bonded fibrous article may be cardboard container containing a plurality of lotion-containing fibrous structures where at least a portion of the lotion from the lotion-containing fibrous structures has migrated to the cardboard container and ultimately to the adhesive where the cardboard container containing the plurality of lotion-containing fibrous structures has been conditioned as described above. The bonded fibrous article is held near one edge (a corner if the bonded fibrous article has a corner), and using a spatula, a portion of one of the plies or bonded surfaces of the bonded fibrous article is folded back to form a hand hold. The folded back portion is manually pulled as rapidly as possible at roughly a 45° to 90° angle relative to each ply's or bonded surface's lengthwise axis to tear the adhesive bond. The percent of torn fiber remaining on the adhesive after separation is estimated (% fiber tear) in 10% increments: i.e., 0%, 10%, 20% . . . 80%, 90% and 100%. The % fiber tear test is repeated on five replicate samples and the average of these five runs is reported as the % fiber tear.

Do not use bonded fibrous article samples that contain obvious defects, such as wrinkles, creases, tears, holes, etc.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A bonded fibrous sanitary tissue product comprising a lotion and two or more surfaces bonded together by at least one bond comprising a water-based foaming adhesive in contact with the lotion.

2. The bonded fibrous sanitary tissue product according to claim 1 wherein the lotion comprises an ingredient selected from the group consisting of: oils, waxes and mixtures thereof.

3. The bonded fibrous sanitary tissue product according to claim 2 wherein the ingredient comprises mineral oil.

4. The bonded fibrous sanitary tissue product according to claim 2 wherein the ingredient comprises petrolatum.

5. The bonded fibrous sanitary tissue product according to claim 1 wherein the bonded fibrous sanitary tissue product comprises a fibrous structure comprising one or more wood pulp fibers.

6. The bonded fibrous sanitary tissue product according to claim 5 wherein the bonded fibrous sanitary tissue product comprises at least two plies of fibrous structure and the bond is between two or more surfaces of the at least two plies of fibrous structure.

* * * * *